US005771466A

United States Patent [19]

Tsugane et al.

[11] Patent Number: 5,771,466

[45] Date of Patent: Jun. 23, 1998

[54] PORTABLE RADIO TRANSCEIVER HAVING ROTARY ANTENNA

[75] Inventors: Yoshiyuki Tsugane; Michio Nagai, both of Tokyo, Japan

[73] Assignee: NEC Corporation, Tokyo, Japan

[21] Appl. No.: 453,894

[22] Filed: May 30, 1995

[30] Foreign Application Priority Data

May 30, 1994 [JP] Japan .................................... 6-116316

[51] Int. Cl.[6] ................................ H04B 1/38; H04B 1/08

[52] U.S. Cl. ............................ 455/90; 455/351; 455/575; 343/702; 343/882; 403/92

[58] Field of Search .............................. 455/90, 347, 351, 455/575; 343/702, 714, 900, 882; 248/292.13, 483; 403/92, 93, 94; H01Q 1/24, 9/30

[56] References Cited

U.S. PATENT DOCUMENTS 3,811,151 5/1974 Kummerlin ........................... 403/92 X
3,946,317 3/1976 Ishimaru et al. ........................ 455/351
4,538,155 8/1985 Stewart ............................... 343/882 X
5,218,370 6/1993 Blaese .................................... 343/702

*Primary Examiner*—Reinhard J. Eisenzopf
*Assistant Examiner*—Philip J. Sobutka
*Attorney, Agent, or Firm*—Young & Thompson

[57] ABSTRACT

A portable radio transceiver of the invention includes an antenna base portion, a coil spring for producing a predetermined repulsive force between an antenna base portion and a casing and a hook portion for housing the antenna base portion within a rear surface of the casing when the coil spring is compressed. One end portion of the antenna base portion is constituted with a pin shaped shaft fixedly implanted in the casing and a rotary base portion in the form of a hollow cylinder having an elliptic cross section. The rotary base portion which is movable along an axis of the hollow portion thereof and and rotatable therein is biased by the coil spring in a direction away from the casing. When a communication is to be done, the antenna is rotated to protrude it in a direction away from a user to thereby reduce influence of the user on the antenna.

7 Claims, 4 Drawing Sheets

FIG. 2
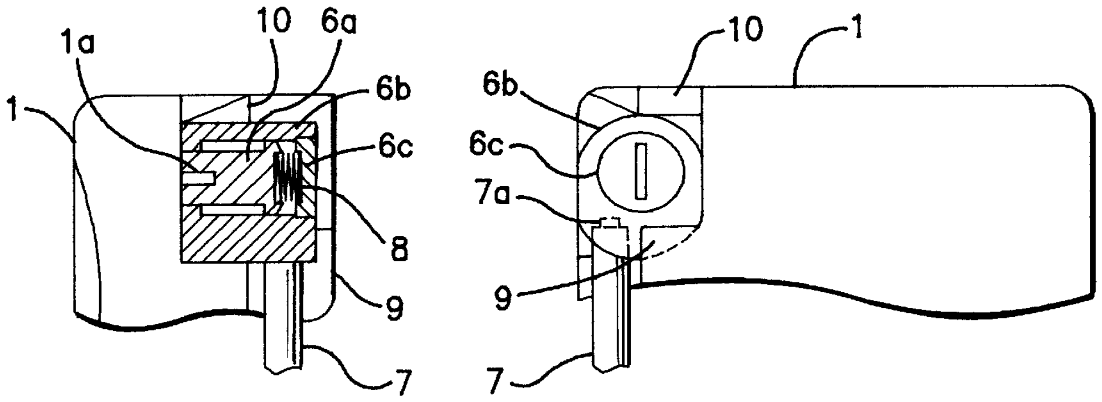
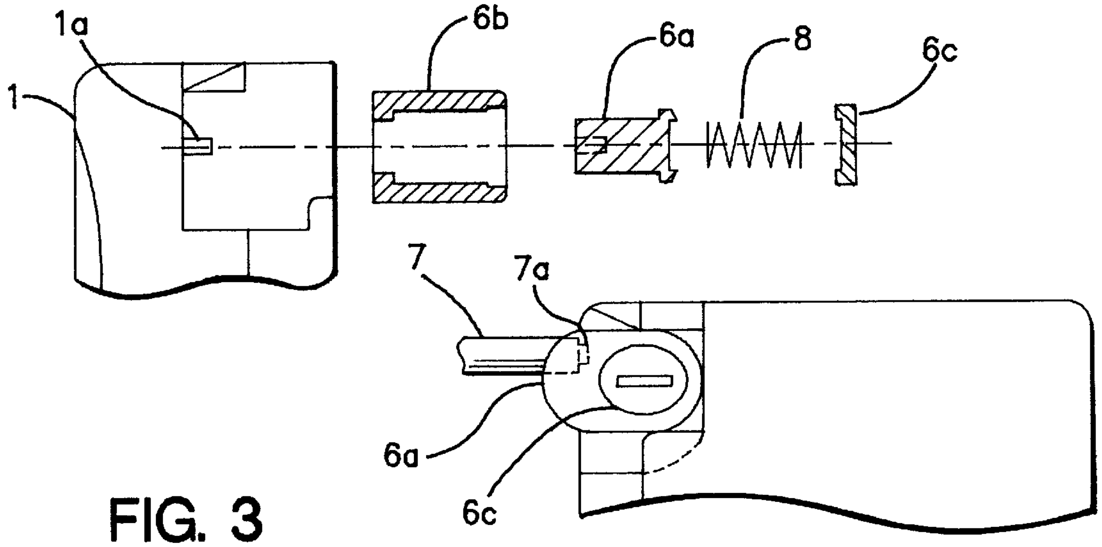
FIG. 3

PORTABLE RADIO TRANSCEIVER HAVING ROTARY ANTENNA

BACKGROUND OF THE INVENTION

The present invention relates to a portable radio transceiver and, particularly, to a portable radio transceiver having a rotary antenna.

A conventional portable radio transceiver includes an antenna for transmitting and receiving a signal. In a structure of such portable radio transceiver, the antenna is generally arranged in an upper portion of a casing of the transceiver and protrudes from the upper portion upward. Generally, the antenna has a structure which is housed within the casing and extensible by sliding or a structure which can be housed in the casing by rotating it by 90 degree. With either structure, the portability of the transceiver is improved while maintaining a desired characteristics of the antenna.

The conventional portable transceiver mentioned above, however, has a problem that since a distance between the antenna and a head of a user is very small, when a signal is transmitted or received in such state, the user's body may become obstacle for the operation of the antenna. That is, the user's body absorbs a portion of electromagnetic wave emitted from the antenna and impedes the transmission/receiving operation. Further, the user's body becomes a barrier by which an electromagnetic field intensity to be received by the antenna is reduced. A degradation of transmission/receiving sensitivity of the antenna degrades the performance of the radio receiver.

SUMMARY OF THE INVENTION

An object of the present invention is to provide a portable radio transceiver which can improve the transmission/receiving sensitivity of its antenna and give a high portability.

A portable radio transceiver according to the present invention includes a coil spring for producing a predetermined repulsive force between an antenna base portion and a casing, and a hook portion for housing the antenna base portion within a rear surface of the casing when the coil spring is compressed. One end portion of the antenna base portion is constituted with a pin shaped shaft fixedly implanted in the casing and a rotary base portion is the form of a hollow cylinder having an elliptic cross section. The rotary base portion which is movable along an axis of the hollow portion thereof and rotatable therein is biased by the coil spring in a direction away from the casing. When a communication is initiated, the antenna is rotated to protrude it in a direction away from a user to thereby reduce influence of the user on the antenna.

Further, as to limit positions in the moving direction of the rotary base portion along an axis of the hollow portion, they may be variable between a use position and a non-use position of the antenna.

BRIEF DESCRIPTION OF THE DRAWINGS

The above and other objects, features and advantages of the present invention will become apparent from the following detailed description when taken with the accompanying drawings in which:

FIGS. 2 and 3 show details of an antenna;

DETAILED DESCRIPTION OF THE PREFERRED EMBODIMENTS

Figure 1A:
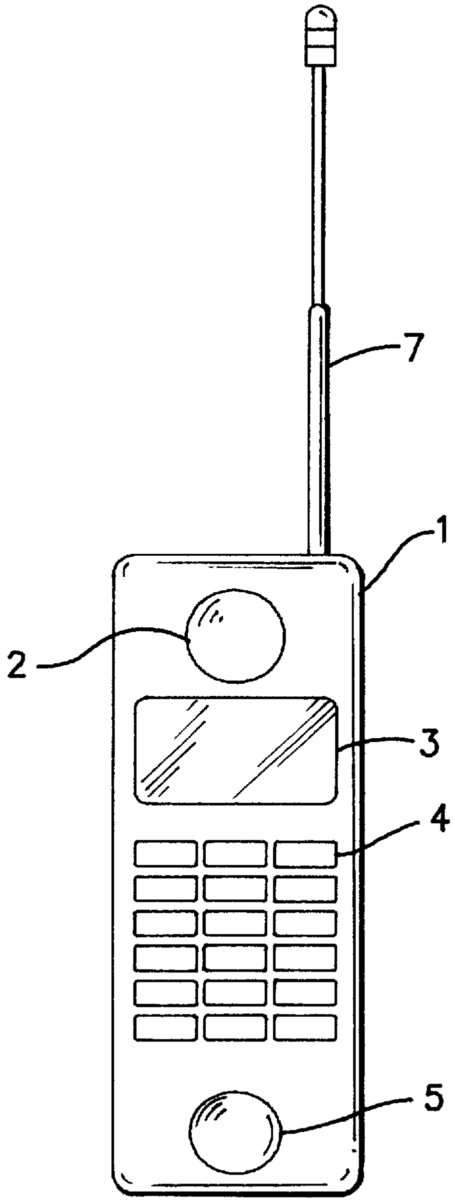
FIGS. 1A and 1B are a front view and a side view of a first embodiment of the present invention, respectively.
Figure 1B:
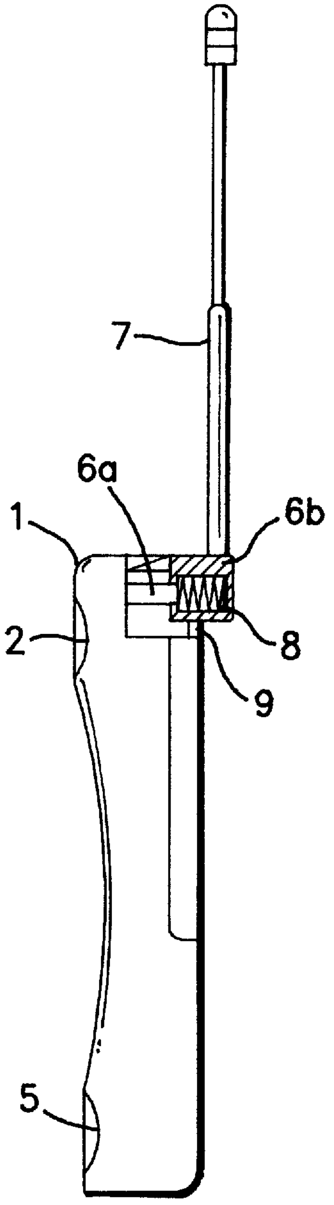

Referring to FIGS. 1A and 1B showing a first embodiment of the present invention, a portable radio transceiver comprises a casing 1, a receiver portion 2 including a loud speaker, a display portion 3 for displaying an input telephone number, etc., a key operating portion 4 and a transmitter portion 5 including a microphone. An antenna portion includes an extensible antenna 7 having a telescopic structure, an antenna base portion 6 which is a coupling portion for connecting it to the casing 1, a coil spring 8 for generating a predetermined repulsive force between the antenna base portion 6 and the casing 1, and a hook portion 9 for holding the antenna base portion 6 within a rear surface of the casing.

The casing 1 is generally formed of a resin material or aluminum, etc., and adapted to housing a mechanical portion and circuit portion, etc., of the portable radio transceiver. The loud speaker of the receiver portion 2 converts a call signal and a voice signal, etc., into an audio signal and outputs it. The display portion 3 is a message display portion. The key operating portion 4 is an input operating portion for mainly inputting a telephone number of the other end. The microphone of the transmitter portion 5 is adapted to convert a transmitted voice signal into an electric signal.

The antenna base portion 6 is adapted to support an end portion of the antenna 7 rotatably about a threaded pin shaft la fixedly connected to the casing. That is, as shown in FIGS. 2 and 3, the antenna base portion 6 is composed of a rotary base portion 6*b*, a shaft 6*a*, the coil spring 8 and a cover 6*c*.

The rotary base portion 6*b* has a generally rectangular parallelepiped configuration having an upper and lower (right and left hand sides in FIG. 2) surface portions which are perpendicular to an axis of the rotary base portion 6*b*, a right and left large side surface portions which are parallel to the axis and a right and left small side surface portions which are also parallel to the axis. The small side surface portions are rounded so that the rotary base portion 6*b* has an elliptic perpendicular cross section to the axis. Height of the rotary base portion 6*b*, that is, a distance between the upper and lower surface portions thereof, is smaller than a thickness of the casing 1. The rotary base portion 6*b* is formed in a position in the vicinity of one of the rounded small side surface portion with an axially extending hollow portion having shoulders at a lower end and an upper end thereof, respectively, and adapted to receive the pin shaft 6*a* and the coil spring 8, in the order. The upper shoulder of the hollow portion of the rotary base portion 6*b* is threaded in which the cover 6*c* having a threaded on an outer peripheral side surface can be fitted by screwing to cover the hollow portion of the rotary base portion 6*b*.

One end of the shaft 6*a* has a threaded hole and can be fixedly connected to the threaded pin shaft 1*a* of the casing 1 by screwing and the other end thereof is formed with a plate-like head portion having a diameter larger than a diameter of the shaft and formed in an upper surface thereof with a circular recess for receiving an end of the coil spring 8, so that the rotary base portion 6*b* is biased upward by the coil spring 8 arranged between the plate-like head portion of the shaft 6*a* and the cover 6*c*. An upward movement of the rotary base portion 6*b* is restricted by the plate-like head portion of the shaft 6*a* when it contacts with the lower shoulder of the hollow portion of the rotary base portion.

In assembling the rotary base portion 6*b* to the casing 1, the rotary base portion 6*b* is put on the casing 1 with a center axis of the hollow portion there of being registered with the threaded pin shaft 1*a* of the casing 1. Then, the shaft 6*a* is fitted in the hollow portion of the rotary base portion 6*b* and fixedly connected to the threaded pin shaft 1*a* by screwing it in the threaded hole of the shaft 6*a*. Then, the coil spring 8 is put of the circular recess of the plate-like head portion of the shaft 6*a* and the cover 6*c* is screwed into the upper shoulder of the hollow portion.

The one end portion of the antenna 7 is threaded and a threaded hole is formed in the other rounded small side surface portion of the rotary base portion 6*b*. The antenna 7 is fixed to the rotary base portion 6*b* by screwing the threaded one end into the threaded hole of the rotary base portion 6*b*.

As will be clear from the above description, the rotary base portion 6*b* is movable along the center axis of the hollow portion within a range defined by the contact position between the lower shoulder of the hollow portion thereof and the plate-like head portion of the shaft 6*a* and the coil spring 8 in a fully compressed state and rotatable about the center axis of the shaft 6*a* in the hollow portion.

Since an expansive force of the coil spring 8 biases the rotary base portion 6*b* in a direction away from the casing 1, the rotary base portion 6*b* protrudes from the threaded pin shaft 1*a* of the casing 1 with the coil spring 8 being in a fully expanded state and, by pressing the rotary base portion 6*b* down against the coil spring 8, the latter can be pushed in the casing 1 and, ultimately, it can be received within a contour of the casing 1.

Referring again to FIG. 1*b*, the receiver portion 2, the display portion 3, the key operation portion 4 and the transmitter portion 5 are arranged in a front surface of the casing 1 in positions suitably defined by human engineering so that the transceiver can be used easily and conveniently.

The antenna base portion 6 assembled as mentioned previously is provided in a left shoulder portion of a rear surface of the casing 1. In order to make a telescopic rod portion of the antenna 7 receivable in an interior of the casing 1, a recess is formed in a corner portion of the rear surface of the casing 1.

In order to receive the antenna base portion 6 having the antenna 7 connected thereto in the casing 1 stably, the hook portion 9 is formed in the rear surface of the casing 1. The hook portion 9 is adapted to restrict a movement of the rotary base portion 6*b* due to radially acting force of the coil spring 8 when the rotary base portion 6*b* is rotated to fold the rod portion of the antenna 7 with the coil spring 8 being in the fully compressed state. The hook portion 9 takes in the form of an extension of the rear surface of the casing 1, which extends over the recess to cover the latter partially.

Since the shaft 6*a* is eccentrically arranged in the vicinity of the one rounded side surface portion of the elliptic rotary base portion 6*b*, a portion of the upper surface portion of the rotary base portion 6*b* in the vicinity of the other rounded side surface portion thereof is brought into contact with the hook portion 9 and caught thereby when the rotary base portion 6*b* is rotated about the shaft 6*a*.

Figure 4A:
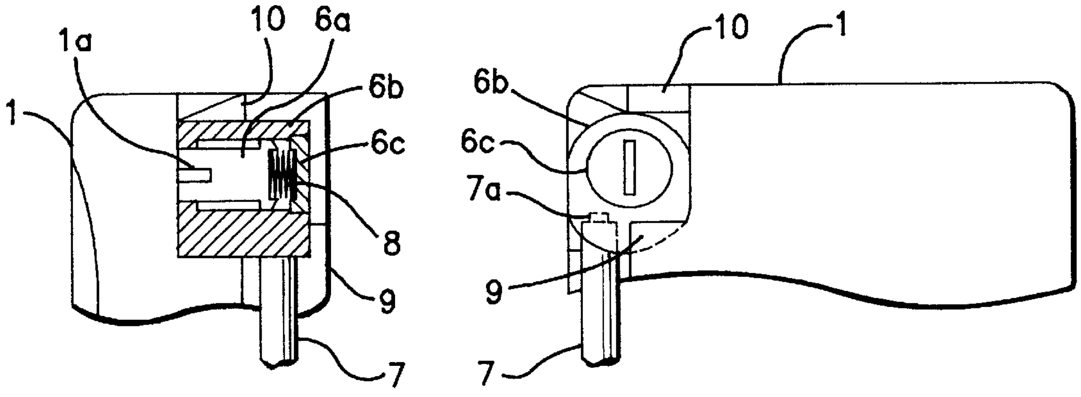
FIGS. 4A–4C show an operation of the antenna.
Figure 4B:
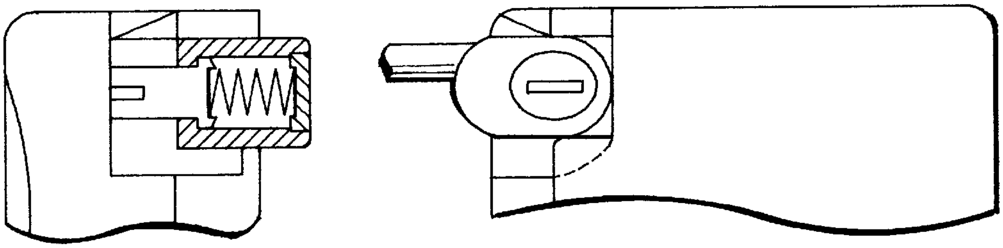
Figure 4C:
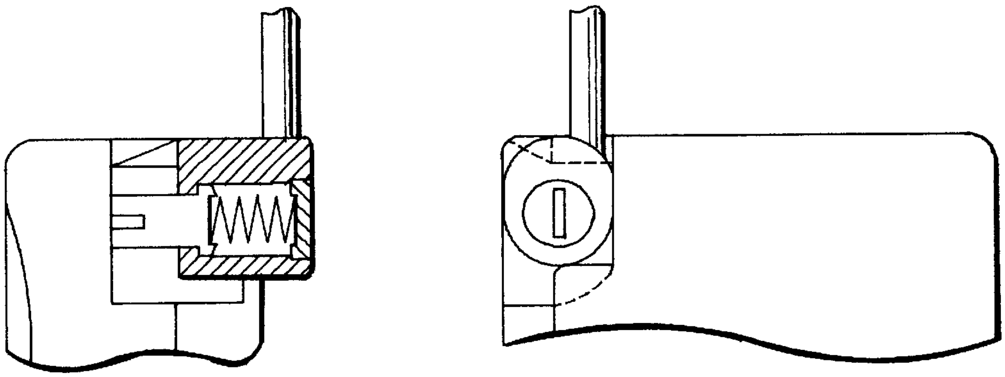

An operation of the antenna will be described with reference to FIGS. 4*a* to 4*c*. In FIG. 4*a*, the other portion of the upper surface of the rotary base portion 6*b* engages with the hook portion 9. In this state, the coil spring 8 is fully compressed and the rotary base portion 6*b* is housed in a space defined by the hook portion 9 and the recess of the casing 1. In FIG. 4*b*, the rotary base portion 6*b* is rotated by 90 degree from the state shown in FIG. 4*a* and the other portion of the upper surface of the rotary base portion 6*b* is disengaged from the hook portion 9. In FIG. 4*c*, the rotary base portion 6*b* is further rotated by 90 degree from the state shown in FIG. 4*b* and the antenna 7 is in an upright position with respect to the casing 1. There is no engagement between the rotary base portion 6*b* and the hook portion 9 in an intermediate state between the state shown in FIG. 4*b* and the state shown in FIG. 4*c*. In the intermediate state, the rotary base portion 6*b* protrudes from the rear surface of the casing 1 and the antenna 7 is held apart from the casing 1.

That is, when the rotary base portion 6*b* is disengaged from the hook portion 9 as shown in FIG. 4*b* by the 90 degree rotation of the rotary base portion 6*b* from the state shown in FIG. 4*a*, the coil spring 8 is allowed to expand with which the rotary base portion 6*b* protrudes from the rear surface of the casing 1. In the state shown in FIG. 4*c*, the telescopic rod of the antenna 7 is extended to operate. The antenna 7 may be used without extending the rod portion thereof.

In folding the antenna 7, the antenna 7 is rotated from the state shown in FIG. 4*c* to the state shown in FIG. 4*b* and, further rotating it from the state shown in FIG. 4*b* while the rotary base portion 6*b* being pushed downs the antenna 7 can be housed as shown in FIG. 4*a*.

As described hereinbefore, in use of the portable radio transceiver of this embodiment, it is possible to obtain a large distance between the user's body and the antenna 7 by rotating the antenna 7 to allow the latter to protrude in the direction away from the user. With such large distance between the antenna 7 and the user, the adverse influence of the user's body on the transceiving operation of the antenna 7 can be reduced.

Figure 5A:
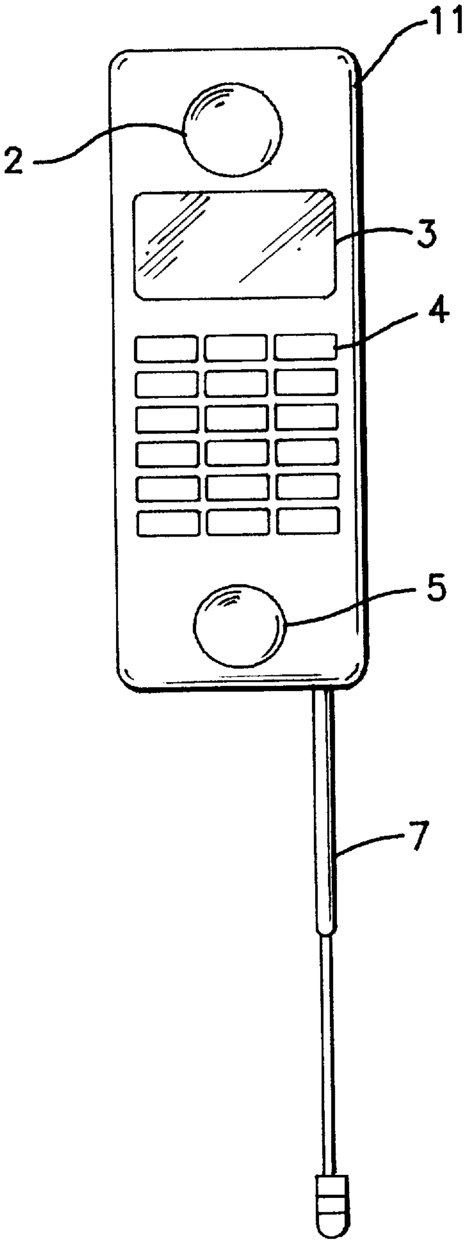
FIGS. 5A and 5B are a front view and a side view of a second embodiment of the present invention, respectively.
Figure 5B:
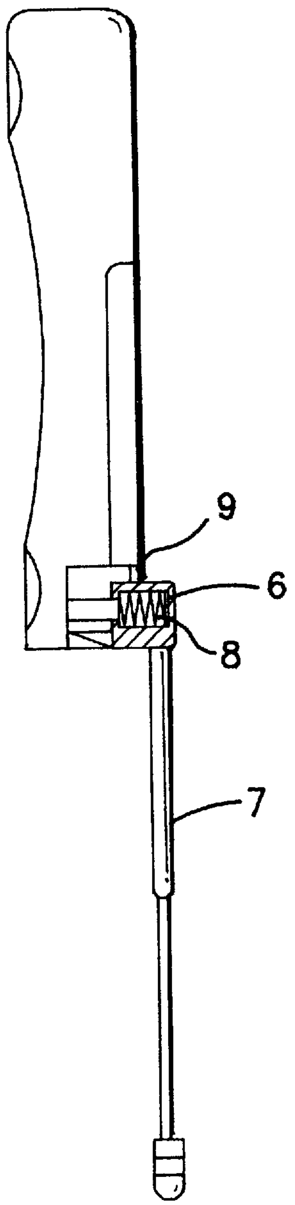

FIG. 5 shows a second embodiment of the present invention. In the second embodiment, an antenna 7 is provided in a lower portion of a casing 11, unlike the first embodiment in which the antenna 7 is provided in the upper portion of the casing 1. With such difference in position in which the antenna 7 is provided, the structure of the casing 11 is different from the casing 1 correspondingly. Since other structural construction of the second embodiment is the same as that of the first embodiment, details thereof are omitted for avoidance of duplication.

Although the present invention has described with reference to the embodiments, the present invention is not limited thereto and can be modified variably without departing from the spirit of the invention. For example, although the hook portion has been described as an extension of the rear surface of the casing to provide a step, it is possible that the upper surface of the rotary base portion is tilted so that it is moved helically with respect to the hook portion with rotation of the rotary base portion. Further, the present invention can be applied to a portable radio transceiver having a foldable casing.

What is claimed is:

1. A portable transceiver comprising a casing, rotary means carried by and rotatable relative to said casing about an axis and having a radially extending portion, means mounting said rotary means for movement relative to said casing along said axis between first and second positions, spring means for biasing said rotary means in one direction along said axis from said first position toward said second position, an antenna mounted on said rotary means for movement with said rotary means between a position in which said antenna is extended relative to said casing and a position in which said antenna is retracted relative to and lies along said casing, and hook means carried by said casing for releasably engaging said radially extending portion so that said rotary means is releasably retained in said first position so that said antenna is in said retracted position and for freeing said radially extending portion to permit movement of said rotary means from said first position to said second position so that said antenna is in said extended position and is free to rotate.

2. A portable transceiver as claimed in claim 1, wherein said casing has an antenna housing portion within which said antenna is received in said retracted position of said antenna.

3. A portable transceiver as claimed in claim 1, said radially extending portion being in sliding engagement with said hook means not only when said antenna is in said retracted position but also when said antenna swings toward said extended position.

4. A portable transceiver as claimed in claim 1, said rotary means protruding partway from said casing in said second position and being fully housed within a recessin said casing in said first position.

5. A portable transceiver as claimed in claim 1, further comprising a shaft mounted fixedly on said casing and extending along said axis, said rotary means being mounted for rotary and axial sliding movement on said shaft.

6. A portable transceiver as claimed in claim 5, said shaft and rotary means having interengaging means preventing movement of said rotary means away from said first position beyond said second position.

7. A portable transceiver as claimed in claim 5, said spring means being disposed between and acting in compression between said rotary means and an end of said shaft.

* * * * *